March 31, 1970     W. M. ALLEN     3,503,760

METHOD OF SMOKING A COMESTIBLE PRODUCT

Filed May 26, 1969     2 Sheets-Sheet 1

INVENTOR.
William M. Allen
BY
Wood, Herron & Evans
ATTORNEYS 3,503,760
METHOD OF SMOKING A COMESTIBLE PRODUCT
William M. Allen, Cincinnati, Ohio, assignor to Development Consultants, Inc., Cincinnati, Ohio, a corporation of Ohio
Continuation-in-part of application Ser. No. 702,233, Feb. 1, 1968, which is a continuation-in-part of application Ser. No. 595,355, Nov. 18, 1966. This application May 26, 1969, Ser. No. 830,919
Int. Cl. A23b 1/04, 3/04
U.S. Cl. 99—229                         4 Claims

ABSTRACT OF THE DISCLOSURE

A method of utilizing nebulized liquid smoke for smoking a comestible product comprising the steps of (a) nebulizing the liquid smoke to form a cloud of the liquid smoke, and (b) exposing the comestible product to the cloud of liquid smoke.

---

This invention relates to a method of smoking comestible products and, more particularly, it is directed to a method of smoking comestible products by using liquid smoke.

This application is a continuation-in-part of my presently pending United States application Ser. No. 702,233, filed Feb. 1, 1968, now abandoned. U.S. Ser. No. 702,233 is a continuation-in-part of my parent United States application Ser. No. 595,355, filed Nov. 18, 1966 now abandoned.

The smoking of meat products has been known for years and is a generally accepted practice in the meat product industry. For the purposes of this application the term "meat product" is meant to include all types of meats, as well as poultry and fish. Smoked meat products have several desirable characteristics that non-smoked meat products do not possess. For example, smoked meat products may be stored without refrigeration for relatively long periods of time because the smoke exercises a preservative effect on the products. The smoke contributes to preservation of meat products by acting as an effective antioxidant, bacteriostatic and bacteriacidal agent, as well as by providing a protective film on the surface of the product. This characteristic, of course, was the primary advantage of smoked meat products prior to development of the refrigeration techniques known today.

Although the smoking of meat products for preservation purposes is not now required, because of modern refrigeration techniques, smoked meat products still retain a high degree of favoritism among consumers and are still produced in great quantities by the meat product industry. One primary reason smoked meat products are desirable to consumers is the smokiness flavor that is imparted to and retained by the product. In addition, smoked meat products take on a unique color that has been found desirable to consumers.

The primary method of smoking meat products known to the art, and the only method until the advent of modern day technology, was by directly exposing the meat products to woodsmoke, also known as direct smoking. Commercial direct smoking operations presently in use normally generate smoke by any of three methods. The most common of these methods includes burning damp hardwood sawdust in a batch operation. The other methods are by heating dry sawdust, or by rotating a disc against a wood log, that is, by friction. Woodsmoke produced by any of the above methods is generally applied to the meat products either by the historical method of suspending the products in a smokehouse filled with the smoke or by the newer method of electrostatically precipitating the smoke particles onto the surface of the products.

The industrial type smokehouse generally is a tiled or sheet metal room wherein hooks are provided for suspending the meat product during smoking and cooking. A number of smoke ducts, each connected with the woodsmoke generating apparatus usually positioned outside the smokehouse enclosure, are provided at varying inlet points throughout the room. Such rooms presently in use vary widely in size, as well as in smoking and cooking capabilities. However, the smokehouse set up for direct smoking has a number of major drawbacks which cause it to be inefficient and undesirable from the modern day production standpoint. For example, the original cost or capital investment in a smokehouse structure and accompanying equipment is substantial, and frequent replacement of corroded smoke generating equipment is often required. Also, the smoke generating apparatus must generally be operated by skilled labor, thereby greatly increasing the unit production cost of the smoked meat products. In addition, the smokehouse presents a substantial safety hazard from the standpoint that the ductwork often catches and retains sparks carried by the smoke and caused by the smoke generating equipment, thereby causing not infrequent fires. Smokehouses create air pollution, the problem of air pollution being under constant scrutiny in modern day cities. Smokehouses also give rise to difficult cleanup and sanitation problems. Direct smoking causes substantial smoke or soot deposits on all structural components which the smoke contacts, for example, ductwork, fans, heater coils, walls and floor of the smokehouse, and so forth. These substantial deposits are difficult and time consuming to remove, but very definitely must be periodically removed to comply with health and sanitation standards, thereby causing higher labor and material costs.

The use of conventional direct smoking methods also has another drawback, namely, the degree of "smokiness" or flavor and the degree of color imparted to the meat products and, hence, product quality, are difficult to control. The flavor and color control problems occur because of the variability of smoke itself. For example, the quality of smoke is affected by many factors such as the method of smoke generation, the type of wood, the intensity of the smoke, the moisture content of the wood, and the temperature of combustion during smoke generation. In addition, to the above listed drawbacks of the direct smoking method, the processing time required to achieve acceptable product taste and color levels is relatively long. A representative smoking and cooking cycle according to the conventional direct smoking method for wieners is approximately three hours, for bacon it is in the range of ten to twelve hours, and for hams it is approximately twelve to fourteen hours.

The use of liquid smoke has been proposed as a means for eliminating many of the problems inherent in the direct smoking method for smoking meat products. For the purposes of this application the term "liquid smoke" is meant to include any and all liquid mediums capable of imparting a degree of "smokiness" flavor to a comestible product, similar to that flavor achieved by direct smoking techniques, when the comestible product is exposed to that liquid medium.

The use of liquid smoke to achieve smoked products has a couple of inherent and desirable advantages over the direct smoking method. The primary advantage is that the flavor of the smoked meat product, that is, the level of smokiness, may be relatively accurately and reproducibly controlled when suitable precautions are taken. Because of the close control available when using liquid smoke, it is possible to provide a continuous process for the smoking of meat products using substantially automatic apparatus. In addition, the use of liquid smoke reduces processing costs by substantially eliminating accompanying smoke generating apparatus for the smokehouse, as well as the skilled labor required to operate that capital equipment. An added important advantage in the use of liquid smoke is that it may be fractionated during its manufacture to eliminate certain undesirable or non-functional materials normally carried by woodsmoke, for example, carcinogenic compounds, which are thought to be pharmacologically undesirable.

As stated, liquid smoke is known and has been used in the past to smoke meat products. There are two main methods presently known to the art for treating meat products with liquid smoke. The first is the method of dipping the meat product into a liquid smoke and the second is the method of directly spraying the meat product with a spray of liquid smoke. However, in each of these methods for treating meat products with liquid smoke, the volume of liquid smoke required to render a realistic "smokiness" flavor to the meat product is relatively great. That is, a relatively large quantity of liquid smoke is required to provide a sufficient bath volume for dipping or a large enough supply for spraying. Also, the prior art liquid smoke methods generally utilize the liquid smoke in a separate dipping or spraying step in an enclosure apart from a cooking step. The cooking step for the meat products is then typically carried out in a modified smokehouse. Thus, a separate dip room or spray stall is necessitated and this, in turn, requires added time for complete processing of the meat products. Because of the dipping or spraying step being separated from the cooking step and because of the separate residence periods for each step, there is often a time lapse between steps that can vary substantially. This time lapse variability may mean that the products are subjected to the liquid smoke for varying time periods before cooking, and if this occurs substantial end product variability for smokiness taste and/or color may result. In addition, the liquid smoke bath and recovered liquid smoke spray must be periodically reclaimed to prevent such prior art methods from becoming prohibitively expensive.

There are, of course, many known variations and modifications to these two basic ways of utilizing liquid smoke. In addition there are other less known ways to impart a smokey flavor to a meat. For example, in Hollenbeck, U.S. 3,330,669, there is disclosed a method of imparting a smokey flavor to a comestible product by, first, coating a layer of viscous or jelly-like liquid smoke onto the interior surface of a container and, second, packaging a meat in that container so that the meat is in intimate contact with the viscous liquid smoke layer. The only smokey flavor imparted to the meat is imparted through the meat's direct contact with the liquid smoke layer. There is no spaced relation between the sides of the container and the meat while imparting the smokey flavor, any and all "gaps" between the container and the meat being filled with the viscous liquid smoke layer. Control of the smokey flavor is achieved by varying the thickness of the viscous liquid smoke layer coated onto the container or by varying the "smokiness" concentration of the viscous liquid smoke solution used.

The method of this invention obviates the problems associated with direct smoking and with known liquid smoking methods while taking advantage of the desirable attributes of liquid smoke. That is, the method of this invention economically and safely provides for the relatively rapid and controllable imparting of smokey flavor to comestible products by using liquid smoke. The method of this invention basically includes the steps of (a) nebulizing liquid smoke to produce a cloud of the liquid smoke, and (b) exposing the comestible product to the cloud until a desirable smokey flavor and/or color has been imparted to the product. For the purposes of this application, phrases that are the same as or similar to "nebulizing liquid smoke to form a cloud of liquid smoke" refer to the atomizing of the liquid smoke. That is, the liquid smoke is transformed from liquid form to a mist or aerosol of liquid smoke, thereby forming a cloud of liquid smoke that remains suspended in the atmosphere for a limited time period under still air condition.

This novel liquid smoke method is in clear contradistinction to the two main prior art liquid smoke methods, namely, the dipping method wherein products are actually soaked in a liquid smoke bath and the direct spraying method wherein a spray of liquid smoke is sprayed directly onto the products, as well as all other methods of which I have knowledge for imparting a smokey flavor to comestible products through use of liquid smoke. Thus, an essential feature of the invention is that there is no direct spray impingement of liquid smoke, except in nebulized form onto the comestible product or onto the walls of the product's casing or enclosure for the purpose of imparting a smokey flavor to the product.

Other advantages will be more apparent from the following detailed description taken in conjunction with the accompanying drawings in which.

Figures 1, 2:
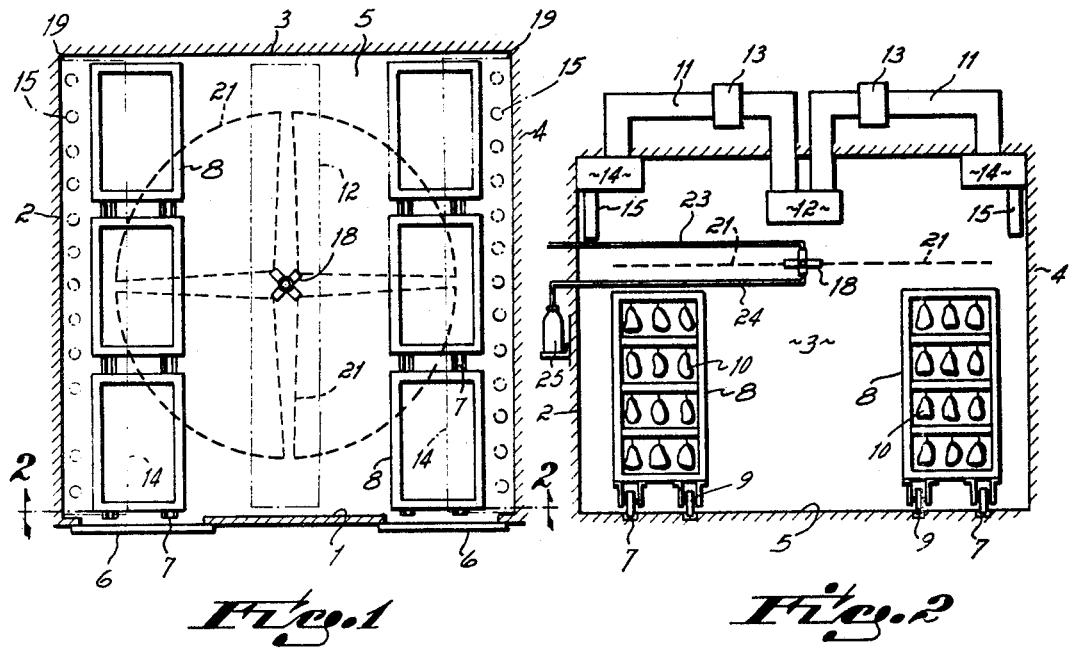
FIGURE 1 is a diagrammatic top view of a typical smokehouse installation adapted to utilize the method of this invention; a number of discrete articles of the product being present in spaced relation to the smokehouse walls throughout imparting of a smokey flavor by the method of this invention.
FIGURE 2 is a cross-sectional view taken along line 2—2 of FIGURE 1.

The method of this invention is applicable to all comestible products for which smoking provides a beneficial effect and/or a smokey flavor but is particularly applicable to cheeses and to meat products, the term meat product for the purposes of this application including all types of meat, poultry and fish. Included in the generic class of meat, as defined for the purposes of this application, are (a) primal cuts such as bacon, ham, pork shoulder, and all other types of primal meat cuts that are boned or not boned, (b) sausage products such as wieners, bologna, salami, sausages, and the like, and (c) other meat food products marketed in loaves or rolls and formed of meat compositions and grades not classified in (a) and (b). Included in the generic class of cheese, as defined for the purposes of this application, are both processed cheese and natural cheese.

Generally speaking, the liquid smoke used may be any liquid medium which, when exposed to the comestible product, imparts a smokiness flavor to the product. The liquid smoke that is used with this method may be a solution of natural woodsmoke flavors prepared by burning a wood, for example, a hickory or a maple, and capturing the natural smoke flavors in a liquid medium, for example, water. Alternatively, the liquid smoke may be derived from the destructive distillation of a wood, that is, the breakdown or cracking of the wood fibers into various compounds which are distilled out of the wood residue. Of course, synthetic liquid smoke of various types may also be used. The liquid smoke can be used at full strength as marketed or can be diluted by water, vinegar, or other appropriate diluent to vary the smoking effect and processing times as desired.

The liquid smoke that is preferred for use with this invention is a solution of natural woodsmoke flavors. This liquid smoke is produced by the limited burning of hardwoods and the absorption of the smoke so generated into an aqueous solution under controlled conditions. The limited burning keeps some of the strong and carcinogenic, which are probably pharmacologically undesirable, hydrocarbon compounds or tars in an insoluble form, thereby allowing removal of these constituents from the final liquid smoke. Thus, by this procedure the desirable wood flavor constituents are absorbed into the solution in a balanced proportion and the undesirable constituents may be removed. The resulting liquid smoke solution is representative of the whole preferred spectrum of smoke flavors without a preference of any one type. The apparatus and method for manufacturing a typical liquid smoke of the preferred type is more fully described in U.S. Patent No. 3,106,473.

The basic steps of this novel method for using liquid smoke to impart a smokey flavor include (a) nebulizing the liquid smoke to produce a cloud thereof, and (b) exposing a comestible product for a predetermined time to that cloud of liquid smoke to establish a desirable flavor in the product. The predetermined length of time that the product is exposed to the cloud is primarily dependent on the smokiness flavor desired in the product. The smokiness flavor of the product, in turn, is dependent on consumer tastes which vary from geographical area to geographical area.

The liquid smoke may be nebulized into a cloud by any technique known to the art as long as the mist or aerosol droplets of liquid smoke so formed are capable of being suspended in the atmosphere under still air conditions. Preferably the liquid smoke cloud formed is of a fine enough droplet size so that at least the major portion of the cloud is capable of remaining airborne under atmospheric still air conditions for at least a limited period of time, for example, on the order of about 30 seconds or more. From my present experience it is preferred to utilize a cloud wherein the major portion of the cloud comprises droplets of a size less than about 150 microns under atmospheric still air conditions.

Various means useful in forming the liquid smoke cloud include: (a) ultrasonic nebulizers, (b) electrostatic nebulizers, (c) electromechanical vibratory foggers, (d) compressed air aspirators, (e) steam aspirators, and the like. It is presently preferred to use a pneumatic atomizing nozzle with a siphon feed for nebulizing the liquid smoke into a cloud. It is preferred that the nebulizing equipment have the capability of varying the quantity of liquid smoke nebulized in a given unit of time so that the process may itself be varied to provide for different comestible products and to provide for different product taste levels to satisfy consumers in different geographic areas.

Of course, once the liquid smoke is nebulized into a cloud, the comestible product is exposed to the cloud for a predetermined time to impart a smokey flavor to the product, the smokey flavor imparted being solely the result of its contact with the cloud as is apparent from the detailed description and examples below. As explained, the length of time that the product is exposed to the cloud depends primarily on consumer taste and consumer taste varies from geographical area to geographical area. The cloud may be first formed and the product thereafter exposed to it. Preferably, however, the product is already within the enclosure as the liquid smoke cloud is generated, thereby exposing the product to the aerosol or mist as soon as it is created. By exposing the product to the cloud as it is nebulized, time is saved and the process thereby made more efficient. Such exposure may be continuous or intermittent as is apparent from the detailed description and examples to follow.

The various process control parameters such as density of the cloud, composition of the liquid smoke, residence time of the product in the liquid smoke cloud environment, temperature of the product, and the like are secondarily dependent on the type of comestible product being processed. Such parameters are primarily dependent on the smokiness taste or flavor desired of the end product. Since the primary consideration in establishing those parameters is the intangible consumer oriented factor of taste, no specific ranges for such characteristics can be set forth because the ultimate determination of whether the end product is good or bad rests with the purely subjective judgment of a consumer. The subsequent examples set out typical process parameters for the smoking of wieners, hams, bacon, chicken, sablefish and cheese which have resulted in acceptable smokiness taste for those products to consumers in the Cincinnati, Ohio area.

Generally speaking, it is preferred the liquid smoke be nebulized within an enclosure of a size sufficient to receive the comestible product in spaced relation to the enclosure's walls, i.e., with a gap between the product's surface and the enclosure's walls, as is apparent from the drawings and examples below; however, when certain specialized types of equipment such as electrostatic nebulizers are used it is foreseen that an enclosure may not be needed. Hence, upon being processed by the method of this invention the comestible product is introduced into the enclosure and is positioned within the enclosure so that the product is positioned in spaced relation to the enclosure's walls as is apparent from the drawings and subsequent examples. The primary function of the enclosure is to maintain the cloud of liquid smoke in close proximity to substantially the entire surface area of the comestible product while the product is maintained in spaced relation to the walls of the enclosure and, thereby, maintain optimum efficiency for the process while imparting the smokey flavor to the product. For example, this method is particularly adaptable to existing smokehouse structures and when used in conjunction therewith for smoking meat products it is preferred that the liquid smoke be nebulized within the enclosure or smokehouse so that the cloud is not forced to travel through ductwork or similar conduits to reach the smoking environment. By nebulizing the smoke directly within the enclosure or smokehouse, condensation in ductwork is avoided and, hence, the method is more efficient. Similarly when smoking cheeses by this method it is preferred the liquid smoke be nebulized within the enclosure when one is used.

In larger dimensioned enclosures it may be desirable to provide circulation means such as a fan or compressed air jets for improving distribution of the cloud throughout the enclosure. For example, in a smokehouse the circulation means may be located toward the ceiling to cause the cloud to flow around the walls, thereby efficiently circulating and permeating the entire enclosure with the cloud.

In addition to the smoking cycle, meat products generally will also be subjected to at least a partial cooking cycle. In the prior liquid smoke processes of dipping and direct spraying, such a cycle was performed after the step of dipping or direct spraying. However, in the case of meat products processed according to the method of this invention the products can be cooked as the smokey flavor is being imparted thereto. As a matter of fact it is preferred that the meat products be exposed to the cloud of liquid smoke either intermittently or continuously for a predetermined length of time during the cooking step, although the meat product can be first subjected to the cloud and then cooked, if desired. Of course, if a comestible product not requiring a cooking step is being processed, for example, a cheese, the product is merely exposed to the cloud of liquid smoke at either ambient or a slightly lower temperature but definitely without cooking. Such a simultaneous sequence of method steps for meat products into a single smoking-cooking cycle provides greater process efficiency for the smoking of meat products with liquid smoke and substantially reduces the unit cost for the meat products so processed.

Meat products are, of course, very different in regard to their cooking requirements; the cooking step cannot be set forth in terms of temperature range, residence time range, and the like because, again, the final criteria for judging the product is smokiness taste which is, in turn, dependent on consumer taste. In addition, certain well-known internal temperature requirements must be met when cooking different meat products to meet government health standards. The subsequent examples set forth typical process parameters for the simultaneous smoking and cooking of wieners, hams, bacon, chicken, and sablefish.

When meat products are being processed according to this invention and when the cooking and smoking steps are combined, it is preferred that the enclosure be preheated before the meat product is placed in it and before the step of nebulizing the liquid smoke into a cloud is commenced. The preheated environmental temperature should be of a temperature substantially above the temperature of the meat product when it is introduced into the enclosure. When meat products are being processed the preferred step sequence of the method is that the enclosure be preheated to at least about 100° F. above the ambient meat product temperature (assuming the meat product is refrigerated or at room temperature), the meat product is then placed in the enclosure in spaced relation to the enclosure's walls and the nebulizing of the liquid smoke begun at substantially the same time as the meat product is put in place. It will be understood that when products such as cheeses that require no cooking step are treated, the pre-heating of the enclosure is not required.

Figure 3:
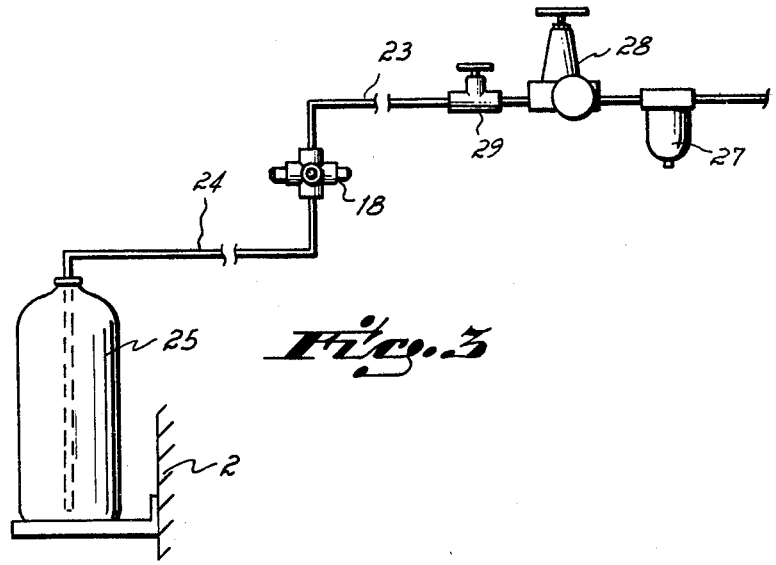
FIGURE 3 is a partial diagrammatic view of typical liquid smoke nebulizing apparatus useful with this invention.

A typical available type of enclosure for use with this method is a smokehouse that has been adapted for the method of this invention, see FIGURES 1–3. As seen from FIGURES 1 and 2, the smokehouse is provided with four tiled walls 1–4 and a tiled floor 5, the smokehouse being of a size to receive a group of discrete pieces of the comestible product all in spaced relation to the enclosure's walls. The front wall 1 has access doors 6 and the floor carries rails 7 extending inwardly into the house from each door. The rails 7 are adapted to receive carts 8 on rollers 9 from which is hung a number of discrete pieces spaced one from the other which constitute the product 10 to be smoked. Hence, the product 10 is introduced into the smokehouse and is positioned therein so that the product is in spaced relation to the walls of the enclosure, substantially the entire surface area of each piece of the product being available to exposure to a liquid smoke cloud.

The particular house illustrated is of the hot air recirculation type able to provide a complete air change two to three times per minute. The air in the house is sucked by blowers 13 from the center of the house through a steam-fed heat transfer coil 12 into ductwork 11, exhausted into plenum chambers 14 and distributed downwardly along opposing side walls 2, 4 through multiple orifices 15. The equipment is sized so that the hot air flow paths established provide heat for the smokehouse enclosure sufficient to meet the smoking step and cooking step needs for the smoking method of this invention.

The nebulizer equipment employed for nebulizing the liquid smoke into a cloud includes four pneumatic atomizing nozzles 18 positioned substantially at right angles one to the other in the center of the smokehouse and directed toward the corners of the smokehouse, see FIGURE 1. Each nozzle 18 is preferably configured to provide a fan-shaped discharge 21 in a substantially horizontal plane. Also, the nozzles 18 are preferably positioned at an elevation so that the fan-shaped discharge 21 extends out over the tops of the carts 8, see FIGURE 2. The liquid smoke cloud so created by nozzles 18 becomes distributed throughout the smokehouse to comletely envelop and contact substantially the entire surface of each discrete piece of product 10 while the product is maintained in spaced relation to walls 1–4 and thereby impart the smokey flavor.

The nozzles 18 are provided with an air line 23 extending to an air pressure source, not shown, and a liquid smoke feed line 24 interconnected with a container 25 of liquid smoke preferably mounted on the wall 2 outside the smokehouse. The vertical distance of the nozzles 18 above the container 25 is known as the siphon height of the system. The air line 23 is provided with a filter 27, a pressure regulator and gauge 28, and a shut-off valve 29. Preferred nozzles 18 used in carrying out the subsequent Examples III–V are those which will produce a nebulized smoke cloud having a major portion thereof formed of liquid smoke droplets of a size less than about 150 microns. The preferred nozzle equipment is that which gives droplets in the size range of 10 to 40 microns under still air conditions when an air pressure of 50 p.s.i. and a siphon height of 8 inches are used. In large dimensioned smokehouses it may be desirable to provide an auxiliary fan, not shown, within the house for improving cloud distribution throughout the house. Such a fan may be located toward the ceiling of the house to cause the liquid smoke cloud to circulate and permeate the entire smokehouse enclosure. The fan preferably would be operated only during generation of the cloud by the nozzles 18.

Although the subsequent Examples III–V are performed in a smokehouse-liquid smoke nebulizer setup as above described, just as other nebulizer apparatus may be used, so may other types of smokehouses be used. For example, the method can be used in conjunction with a gravity feed smokehouse where heat is supplied from underneath a grilled floor by a series of gas jet flames. In this smokehouse structure the cloud of liquid smoke would be preferably supplied from beneath the grilled floor, the heat and nebulized liquid smoke cloud exhausting through the ceiling of the house. The smoking method of this invention can also be adapted to a continuous process by providing (a) a continuously or intermittently moving conveyor that passes through a liquid smoke cloud chamber and, subsequently, through a heating chamber when meat products are being processed, or, alternatively, (b) a single extended length chamber wherein both the smoking and cooking steps are performed simultaneously. Of course, if cheeses are being processed, the cooking step is eliminated in the continuous process.

Figure 4:
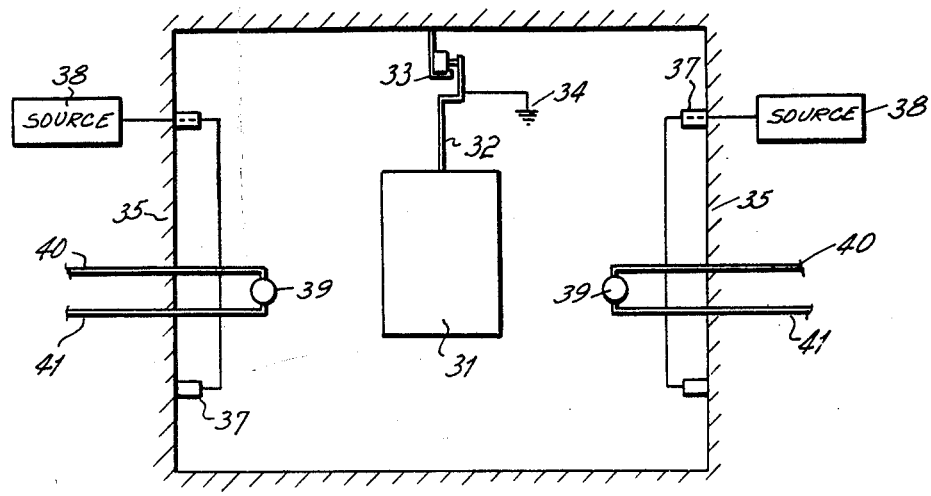
FIGURE 4 is a diagrammatic end view of a typical continuous processing installation adapted to use the method of this invention, the product being present in spaced relation to the smoke house walls throughout imparting of the smokey flavor.
Figure 5:
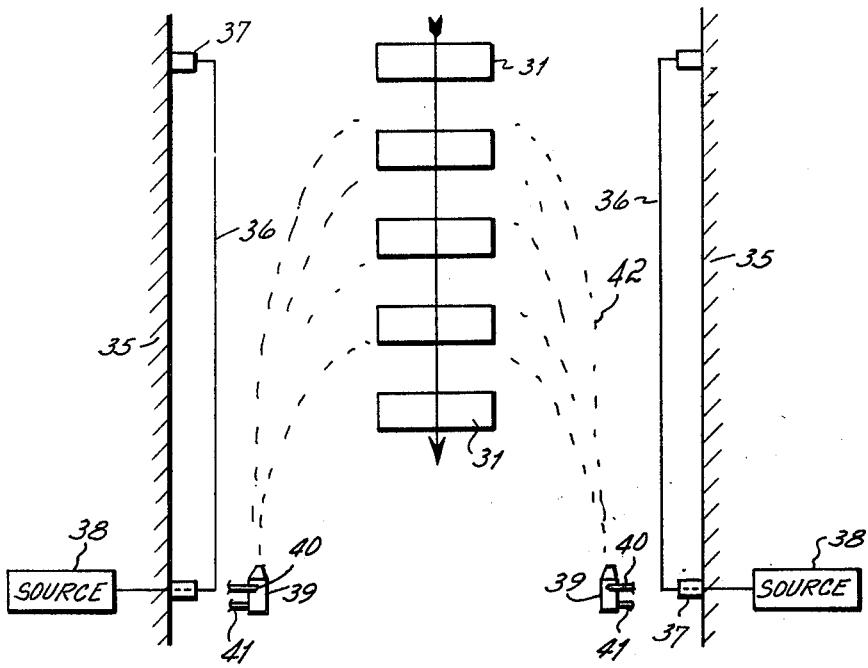
FIGURE 5 is a top view of the apparatus illustrated in FIGURE 4.

Alternatively, the method of this invention may be carried out by utilizing electrostatic nebulizer techniques. Such techniques are particularly useful with my smoking method when a continuous process is used as opposed to the batch type smokehouse process. Typical electrostatic nebulizer equipment useful in carrying out my method is illustrated in FIGURES 4 and 5, although it will be understood by those in the art that other types of electrostatic equipment may also be adapted to my method. As seen in FIGURE 4, a tunnel is provided through which the comestible product 31 passes in a continuous manner, the discrete product pieces being introduced and maintained in spaced relation to walls 35 of the tunnel as it passes therethrough. The product 31 is suspended from a bracket 32 which in turn moves along a conveyor track 33 for transporting the product through the tunnel, substantially the entire surface area of each discrete product piece being available for contact with a liquid smoke cloud. The bracket 32 and track 33 are suitably insulated and the bracket 32 supporting the product is grounded as at 34. Along the walls 35 of the tunnel are positioned grids 36 that are insulated from the wall by a suitable insulator 37. The grids are preferably charged to a negative of, for example, between 60 and 150 kv., by suitable power sources 38. Thus, since the grids 36 carry negative charges and the bracket 32 is grounded, positive charges are induced in the comestible products.

A nozzle 39 is positioned between each grid 36 and the conveyor track on each side of the tunnel. Each nozzle 39 is of the penumatic atomizing type and is provided with a compressed air line 40 and a liquid smoke feed line 41. The nozzles 39 are directed in a counterdirection of travel of the comestible products through the tunnel, see FIGURE 5. The nozzles are arranged to spray in a counterdirection parallel to the conveyor so that if the mechanical momentum of the liquid nebulized cloud particles is too great to be overcome by the electrostatic attraction of the closer products 31, they will be deposited on subsequent products downstream without being discharged from the general grid area. Thus, when the atomized droplets 42 of the nebulized liquid smoke cloud are projected into the negative field created by the grids, they acquire a negative charge and tend to be attracted to the surface of the positively charged comestible product. All other areas, for example, the walls and roof of the tunnel are sufficiently insulated to avoid attraction of the charged droplets.

Although the method is generally described for meat products in conjunction with conventional smokehouses such as are known to the industry today, any type heating equipment such as, for example, induction heaters or high frequency heaters, can be used to provide heat for the cooking step and any environmental enclosure can be used, that is, it is not necessary that a "smokehouse" of the historical or present day industrial type be used.

This invention is further illustrated by means of the following examples. However, it is not intended to limit the invention by the examples below, but merely to illustrate the use of the invention with different comestible products.

EXAMPLE I

A number of uncooked wieners are hung, freely suspended in a laboratory oven enclosure, i.e. in spaced relation to the walls of the enclosure. The wieners initially have an internal temperature of 45° F. Subsequently, the weiners are exposed to a conventional temperature-time cooking cycle as follows: (1) 80° F. for 15 minutes; (2) 90° F. for 15 minutes; (3) 100° F. for 15 minutes; (4) 110° F. for 15 minutes; (5) 120° F. for 15 minutes; (6) 130° F. for 15 minutes; (7) 140° F. for 15 minutes; (8) 150° F. for 15 minutes; and (9) 180° F. for 30 minutes. The internal temperature of the wieners, measured at the end of the ninth step of the cycle, is 150° F.

A cloud of nebulized liquid smoke is introduced into the enclosure through a plastic tube during the second step of the cycle, that is, for 15 minutes while the oven is at 90° F. The liquid smoke is a full strength aqueous solution of natural woodsmoke flavors sold under the trademark of "Smoketex." The liquid smoke is nebulized into a cloud by a conventional ultrasonic nebulizer, said smoke cloud being characterized in that a major portion thereof is formed of liquid smoke droplets of a size less than about 150 microns.

After the cooking cycle has been completed, the wieners are water rinsed and chilled in a refrigerator to about 40° F. The wieners were then removed from the refrigerator and sliced, the slices being tasted by a test panel of five people from Cincinnati, Ohio. Each person declared the smokiness flavor of the wieners to be delicious.

EXAMPLE II

A number of uncooked wieners are hung, freely suspended in a laboratory oven enclosure, i.e. in spaced relation to the walls of the enclosure. The wieners initially have an internal temperature of 45° F. Subsequently, the weiners are subjected to a time-temperature cooking cycle of: (1) 180° F. for 15 minutes, and (2) 180° F. for 45 minutes.

A cloud of liquid smoke formed by an ultrasonic nebulizer of the type set forth in Example I is introduced through a plastic tube into the enclosure during the first step of the cycle only. The liquid smoke is the same as used in Example I.

After the wieners have been smoked and cooked they are rinsed and refrigerated as in Example I. The wieners are then sliced, the taste and color of the slices being very acceptable to Cincinnati, Ohio consumers.

EXAMPLE III

A smokehouse as illustrated in FIGURES 1 and 2 and described earlier is preheated to 210° F. by the hot air equipment. The blowers are then turned off and a load of wieners at room temperature suspended from carts is introduced into the smokehouse.

A cloud of liquid smoke is then created in the house through nozzles which are operated at 50 p.s.i. and a siphon height of 8 inches said cloud of liquid smoke in said house being characterized in that a major portion thereof is formed of liquid smoke droplets of a size less than about 150 microns. Generation of the liquid smoke cloud by the pneumatic atomizing nozzle system described continues for 10 minutes for smoking the wieners and the nozzles are then shut off. The liquid smoke used is Charsol.

The blowers are then turned back on and the house, by means of the hot air circulation, is maintained at 210° F. for the next 25 minutes for cooking the wieners. Thus, the smoking and cooking steps are completed in 35 minutes.

The wieners are then removed from the smokehouse, water rinsed, and refrigerated at 40° F.

A statistical survey was taken at a Cincinnati, Ohio supermarket where the wieners smoked according to this method (wieners A) were compared with wieners (also directed to the Cincinnati area consumer) smoked by a conventional sawdust direct smoking method (wieners B). The results were as follows:

| | |
|---|---|
| Number persons preferring wiener A | 147 |
| Number persons preferring wiener B | 98 |
| No preference | 25 |

EXAMPLE IV

The smokehouse and liquid smoke nebulizing equipment illustrated in FIGURES 1–3 are used to smoke bacon. Nebulizing equipment conditions and the liquid smoke used are as stated in Example III. The house is preheated to 210° F., the blowers turned off, and a load of bacon at about 60° F. is introduced into the house. The bacon is smoked and cooked according to the following time-temperature-smoke cycle:

(1) continuously generate a cloud of liquid smoke for 5 minutes and expose to the cloud during that time with no hot air flow;
(2) expose only to the hot air flow at 210° F. for 10 minutes with no cloud being generated.

} Repeat in sequence for 2 hours.

At the end of the cycle the bacon has reached an internal temperature of about 120° F. The bacon is then refrigerated at 40° F. without a water rinse. Slices of bacon are fried and declared very delicious to Cincinnati, Ohio consumers with color being very acceptable.

EXAMPLE V

The smokehouse and nebulizing equipment illustrated in FIGURES 1–3 are used to smoke hams. Nebulizing equipment conditions and the liquid smoke used are as stated in Example III. The house is preheated to 210° F., the blowers turned off, and a number of hams, averaging approximately 19 pounds each, is introduced into the house. The hams are smoked and cooked according to the following time-temperature-smoking cycle:

(1) continuously generate a cloud of liquid smoke for 2 minutes and expose to the cloud during that time with no hot air flow;
(2) expose only to hot air flow at 210° F. for 8 minutes with no cloud being generated;
(3) expose only to hot air flow at 210° F. for ½ hour with no cloud being generated.

} Repeat in sequence for 2½ hours.

At the end of the cycle the hams have reached an internal temperature of about 145° F. The hams are then refrigerated at 40° F. without a water rinse.

Slices were subsequently cut from the hams and declared delicious to Cincinnati, Ohio consumers with color being very acceptable.

EXAMPLE VI

A number of uncooked chicken legs and breasts are placed on an open grill rack in a laboratory oven enclosure. The pieces initially have an internal temperature of 60° F. Subsequently, the pieces are cooked according to a time-temperature cycle as follows: (1) preheat enclosure to 120° F. then place pieces in enclosure, (2) 120° F. for 10 minutes, (3) 200° F. for 30 minutes, and (4) 260° F. for 25 minutes. At the end of the cooking cycle the internal temperature of the pieces is 160° F. The pieces are permitted to cool to room temperature after the entire cycle has been completed. During the entire cycle of 65 minutes the pieces are alternatively and simultaneously exposed to a cloud of liquid smoke for 5 minutes and then not exposed for 10 minutes. The liquid smoke used is the same as in Example III and the nebulizing equipment used is the same as in Example I.

Several Cincinnati, Ohio consumers tasted the chicken pieces and declared the smokiness flavor to be acceptable.

EXAMPLE VII

A number of uncooked chicken legs and breasts are placed on an open grill rack in a laboratory oven enclosure. The pieces are cooked according to a time-temperature cycle as follows: (1) preheat enclosure to 130° F. then place pieces in enclosure, (2) 130° F. for 50 minutes, (3) 140° F. for 10 minutes, (4) 160° F. for 10 minutes, (5) 180° F. for 10 minutes, and (6) 200° F. for 20 minutes. During the first 20 minutes of the second step the pieces are simultaneously exposed to a nebulized cloud of liquid smoke. The liquid smoke used is the same as in Example III and the nebulizing equipment used is the same as in Example I. The pieces are then permitted to cool to room temperature after the entire cooking-smoking cycle has been completed.

The pieces were then reheated and tasted by a number of Cincinnati, Ohio consumers; all declared the smokiness flavor to be excellent and the pieces delicious.

EXAMPLE VIII

A number of 8 ounce Atlantic sablefish sections that have been air dried for 12 hours with fans are placed in a laboratory oven enclosure. The pieces initially have an internal temperature of 60° F. The pieces are cooked according to the following time-temperature cycle: (1) preheat enclosure to 130° F. then place pieces in enclosure, (2) 130° F. for 60 minutes, (3) 140° F. for 10 minutes, (4) 160° F. for 10 minutes (5) 180° F. for 10 minutes, and (6) 200° F. for 20 minutes. At the end of the cooking process the fish sections have an internal temperature of 160° F. During the first 30 minutes of the second step of the cooking cycle the sections are simultaneously exposed to a nebulized cloud of liquid smoke. The liquid smoke used is the same as in Example III and the nebulizing equipment used is the same as in Example I. After the cooking-smoking cycle the sections are chilled to 50° F.

The sections were then warmed in an oven at 325° F. and tasted by a number of Cincinnati, Ohio consumers all of whom declared the sections to have an excellent smokiness flavor.

EXAMPLE IX

A number of cheddar cheese pieces, each 1 inch x 1 inch x 4 inches, are arranged on an open grill rack in a laboratory oven enclosure. The temperature of the enclosure is 70° F. The cheeses are four different types, namely, very sharp, sharp, mild, and mellow. The cheeses are exposed, without heating, to a nebulized cloud of liquid smoke for 30 minutes. The liquid smoke used is the same as in Example III and the nebulizing equipment used is the same as in Example I. No melting or warping of the cheeses is experienced. Also, no discoloring or drying of the cheese surfaces is experienced.

The cheeses were sampled by a group of about 35 people from Cincinnati, Ohio. All declared the cheeses to be acceptable for smokiness flavor.

Generally speaking, the method of this invention permits better control of the smokiness flavor and taste for comestible products in that flavor can be automatically and reproducibly controlled by regulating the density of the liquid smoke cloud generated and the residence time of the product in that cloud. In addition, this novel method provides a wide degree of variability in the different types of comestible products that can be processed in the same enclosure, or even without requiring an enclosure if certain electrostatic techniques are used. Also, my method establishes substantial labor savings in that the labor required for start-up, operation, control, and clean-up is substantially reduced over prior art smoking methods. An additional advantage of this invention is that it can be readily adapted to smoke comestible products in a large volume enclosure or a small volume enclosure, depending on the needs and requirements of the user.

With respect to prior art direct smoking methods, the method of this invention permits a much cleaner and more sanitary smoking operation in that the smoking environment can be quickly cleaned with water and/or a little detergent, thereby eliminating the dirt associated with sawdust, sawdust generators, and tar-filled ducts. In addition, my method promotes safety in that all fire hazards from direct smoking are eliminated, provides equipment and space savings in that costly conventional generators are eliminated and that generator space is freed for other uses, and permits easy installation in that no major rebuilding of conventional smokehouses is required. Also, the method of this invention substantially reduces air pollution within the smokehouse's general vicinity.

With regard to prior art liquid smoking methods, the method of this invention provides a solution to substantial sanitation problems associated with the reclaim step in those prior art methods in that no reclaim step is required in my method. In addition, no separate spray stalls or dipping facilities are required for my method, and my method provides substantial raw material savings in that only limited quantities of liquid smoke are required to carry out the method.

In the case of meat products, the method of this invention enables products to be smoked in a much shorter time than the prior art, for example, wieners in 35 minutes versus three hours for the prior art. In the case of comestible products such as cheese, other additional advantages are realized. Processed and natural cheese are generally prepared in relatively large blocks at the manufacturing level but, to achieve a suitable smokiness flavor in cheese, the cheese must be cut into relatively small pieces before it is exposed to the smoke. This requirement causes substantial economic problems because of the extra labor and capital investment required for cutting the cheese, smoking the cheese pieces, and thereafter packaging the small pieces at the manufacturing level. Also, in transporting the cheese to the retail level, it is much more economical to transport it in big chunks than in very small pieces. Since it has been found that consumers buy cheese only in relatively small quantities, and because it is usually cut into such small quantities at the retail level, it would be most desirable to have a method by which the small cheese pieces can be smoked in small quantities at the retail level. The distinct advantage of this method for cheese, then, is that the cheese can be shipped in large lumps, thereafter cut up at the warehouse or retail level into the consumer desired small pieces, and then smoked immediately in a relatively small enclosure by the method of this invention. That is, the method of this invention provides a practical smoking method for establishing a smokiness flavor in a relatively small enclosure. This means low cost and good economics to the cheese retailer. Typical equipment for smoking the cheeses in small quantities at the retail store level that may be used as set out in Example IX. Also, when cheese is smoked with the method of this invention, no discoloring of the cheese is observed.

Although the invention has been described in considerable detail with particular reference to its preferred embodiments, variations and modifications in its use can be effected and still remain within the scope of the invention as described hereinbefore without departing from the spirit of the appended claims.

What I desire to claim and protect by Letters Patent is:

1. An improvement in the imparting of a smokey flavor to a comestible product consisting of the steps of
providing an enclosure having walls, said enclosure being of a size sufficient to receive said product in spaced relation to said walls,
introducing said product into said enclosure such that said product is positioned in spaced relation to the walls of said enclosure,
nebulizing liquid smoke to produce a cloud of liquid smoke in said enclosure, said cloud characterized in that a major portion thereof is formed of liquid smoke droplets of a size less than about 150 microns,
exposing said product to said liquid smoke cloud inside said enclosure while maintaining said product in said spaced relation to the walls of said enclosure to impart said smokey flavor to said product, the smokey flavor imparted to said product being solely the result of its contact with said cloud, and
controlling the smokey flavor imparted to said product by regulating either one or both of the density of said cloud and the residence time of said product in said cloud.

2. An improvement in the imparting of a smokey flavor to a comestible product as set forth in claim 1 wherein the smokey flavor is imparted to said product by intermittently producing said cloud in said enclosure for limited periods of time.

3. An improvement in the imparting of a smokey flavor to a comestible product as set forth in claim 1 wherein said product is a meat product and further including the step of
at least partially cooking said meat product in said enclosure, the cooking of said meat product being simultaneous with exposing said meat product to said liquid smoke cloud.

4. An improvement in the imparting of a smokey flavor to a comestible product as set forth in claim 1 wherein the environment inside said enclosure is preheated to a temperature elevated above that of said product at the time said product is exposed to said cloud, and wherein said cloud is agitated within said enclosure to improve the distribution of said cloud relative to said product.

References Cited

UNITED STATES PATENTS

| | | | |
|---|---|---|---|
| 2,312,339 | 3/1943 | Jones | 99—259 |
| 2,352,590 | 6/1944 | Trinkle | 99—229 |
| 2,789,914 | 4/1957 | Davis | 99—229 |
| 3,232,210 | 2/1966 | Ogle | 99—229 X |
| 3,330,669 | 7/1967 | Hollenbeck | 99—229 X |

HYMAN LORD, Primary Examiner